US011675389B2

(12) United States Patent
Chang et al.

(10) Patent No.: US 11,675,389 B2
(45) Date of Patent: Jun. 13, 2023

(54) ELECTRONIC DEVICE

(71) Applicant: ASUSTeK COMPUTER INC., Taipei (TW)

(72) Inventors: Yung-Tsung Chang, Taipei (TW); Chih-Chiun Lin, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/328,824

(22) Filed: May 24, 2021

(65) Prior Publication Data

US 2021/0373598 A1 Dec. 2, 2021

(30) Foreign Application Priority Data

May 27, 2020 (CN) .......................... 202010459748.3

(51) Int. Cl.
*G06F 1/16* (2006.01)
(52) U.S. Cl.
CPC .......... *G06F 1/1624* (2013.01); *G06F 1/1647* (2013.01); *G06F 1/1616* (2013.01)
(58) Field of Classification Search
CPC .... G06F 1/1624; G06F 1/1647; G06F 1/1616; G06F 1/1654; G06F 1/1637; G06F 1/1656; G06F 1/1675; G06F 1/1679; G06F 1/1681; G06F 1/1683; G06F 1/16; G06F 1/1601; G06F 1/1607; G06F 1/1613; G06F 1/1632; G06F 1/181; H01F 7/00
USPC .................................................... 361/679.28
See application file for complete search history.

(56) References Cited

U.S. PATENT DOCUMENTS

| | | | |
|---|---|---|---|
| 8,717,132 B2* | 5/2014 | Lancaster-Larocque | ..................... C25D 11/18 335/207 |
| 9,167,711 B2* | 10/2015 | Lee | ........................ G06F 3/0202 |
| 9,910,464 B2* | 3/2018 | Lyles | .................... G06F 1/1626 |
| 2002/0113199 A1* | 8/2002 | Kim | ..................... H04M 1/0214 250/221 |
| 2009/0091881 A1* | 4/2009 | Lee | ...................... F16M 11/046 248/223.41 |

(Continued)

FOREIGN PATENT DOCUMENTS

| | | |
|---|---|---|
| CN | 201311608 Y | 9/2009 |
| CN | 205620683 U | 10/2016 |

(Continued)

*Primary Examiner* — Adrian S Wilson
*Assistant Examiner* — Gage Crum
(74) *Attorney, Agent, or Firm* — McClure, Qualey & Rodack, LLP (57) ABSTRACT

An electronic device includes: a host; a first screen, comprising a first connecting edge, the first screen is slidably connected to the host by the first connecting edge, and the first screen slides between a first slide position and a second slide position relative to the host; a magnet module, disposed on the first screen or on the host, the magnet module comprises a plurality of magnet components, and the magnet components are arranged at intervals; and a magnetic induction module, disposed on the host or on the first screen relative to the magnet module, wherein when the first screen is flipped towards the host at any position between the first slide position and the second slide position, the magnetic induction module detects a magnetic field of the magnet module to causes the host to switch to a system state.

8 Claims, 11 Drawing Sheets

(56) References Cited

U.S. PATENT DOCUMENTS

| | | | | |
|---|---|---|---|---|
| 2009/0102744 A1* | 4/2009 | Ram | ................ | G06F 1/1696 |
| | | | | 345/1.1 |
| 2010/0298032 A1* | 11/2010 | Lee | ................ | G06F 1/1616 |
| | | | | 345/173 |
| 2012/0068797 A1* | 3/2012 | Lauder | ................ | G06F 1/1656 |
| | | | | 29/428 |
| 2019/0004568 A1* | 1/2019 | Kaya | ................ | G06F 1/1647 |
| 2020/0272201 A1* | 8/2020 | Tzou | ................ | H04M 1/0214 |
| | | | | 250/221 |

FOREIGN PATENT DOCUMENTS

| | | |
|---|---|---|
| CN | 108958364 A | 12/2018 |
| CN | 208253226 U | 12/2018 |
| CN | 109668564 A | 4/2019 |

\* cited by examiner

ELECTRONIC DEVICE

CROSS-REFERENCE TO RELATED APPLICATION

This application claims the priority benefit of China Application Serial No. 202010459748.3, filed on May 27, 2020. The entirety of the above-mentioned patent application is hereby incorporated by reference herein and made a part of the specification.

BACKGROUND OF THE INVENTION

Field of the Invention

This application relates to an electronic device, and in particular, to an electronic device including a removable screen.

Description of the Related Art

With the rapid development of science and technologies, notebook computers are widely used by the public. However, conventional notebook computers cannot meet requirements of users for various operating modes. Therefore, a notebook computer with a removable screen is developed.

In the design of a conventional notebook computer with a removable screen, the screen horizontally slides to different positions for different applications of a user. However, when the lid of the conventional notebook computer with a removable screen is closing at any position in a sliding range other than a preset position, it cannot be entered to a dormant state.

BRIEF SUMMARY OF THE INVENTION

According to an aspect of the disclosure, an electronic device is provided. The electronic device includes: a host; a first screen, comprising a first connecting edge, the first screen is slidably connected to the host by the first connecting edge, and the first screen slides between a first slide position and a second slide position relative to the host along a horizontal axis parallel to the first connecting edge; a magnet module, disposed on the first screen or on the host, the magnet module comprises a plurality of magnet components, and the magnet components are arranged at intervals; and a magnetic induction module, disposed on the host or on the first screen relative to the magnet module, wherein when the first screen is flipped towards the host at any position between the first slide position and the second slide position, the magnetic induction module detects a magnetic field of the magnet module to causes the host to switch to a system state.

For other functions of the disclosure and detailed content of embodiments, descriptions are provided below with reference to the accompanying drawings.

BRIEF DESCRIPTION OF THE DRAWINGS

To describe the technical solutions of the embodiments of the disclosure or the existing technology more clearly, the following briefly introduces the accompanying drawings required for describing the embodiments or the existing technology. Apparently, the accompanying drawings in the following description show only some embodiments recorded in the disclosure, and a person of ordinary skill in the art still derives other drawings from these accompanying drawings without creative efforts.

DETAILED DESCRIPTION OF THE EMBODIMENTS

To make the objectives, features, and effects of the disclosure more comprehensible, embodiments and accompanying drawings are provided to describe the disclosure in detail in the following.

Referring to FIG. 1 to FIG. 4 and FIG. 11, an electronic device 100 includes a host 110, a first screen 120, a magnet module 140, and a magnetic induction module 150.

In some embodiments, the host 110 may include a keyboard, a touch panel, a processor, a motherboard, a graphics card, a network card, a memory, various connection ports (such as a USB interface or an HDMI interface), a battery, a combination thereof, other suitable electronic components, or the like. This application is not limited thereto.

In an embodiment, the first screen 120 is rectangular. The first screen 120 includes a first connecting edge 120a and a second connecting edge 120b, and the first connecting edge 120a is adjacent to the second connecting edge 120b. The first screen 120 is slidably connected to a connecting side S1 of the host 110 by the first connecting edge 120a. In some embodiments, a length of the first connecting edge 120a of the first screen 120 is approximately the same as a length of the connecting side S1 of the host 110. In this case, the first screen 120 slides between a first slide position P1 and a second slide position P2 relative to the host 110 along a horizontal axis V1 of the first connecting edge 120a. In addition, the first screen 120 axially rotates along the horizontal axis V1 at any position between the first slide position P1 and the second slide position P2 relative to the host 110.

In some embodiments, the first screen 120 is connected to the host 110 by a side-sliding rotation shaft with a slide rail, to horizontally slide and axially rotate relative to the host 110. A distance between the first slide position P1 and the second slide position P2 is a maximum sliding range of the side-sliding rotation shaft mechanism. However, the disclosure is not limited thereto. In other embodiment, the first screen 120 horizontally slide and axially rotate relative to the host 110 by another suitable mechanism.

Figure 10:
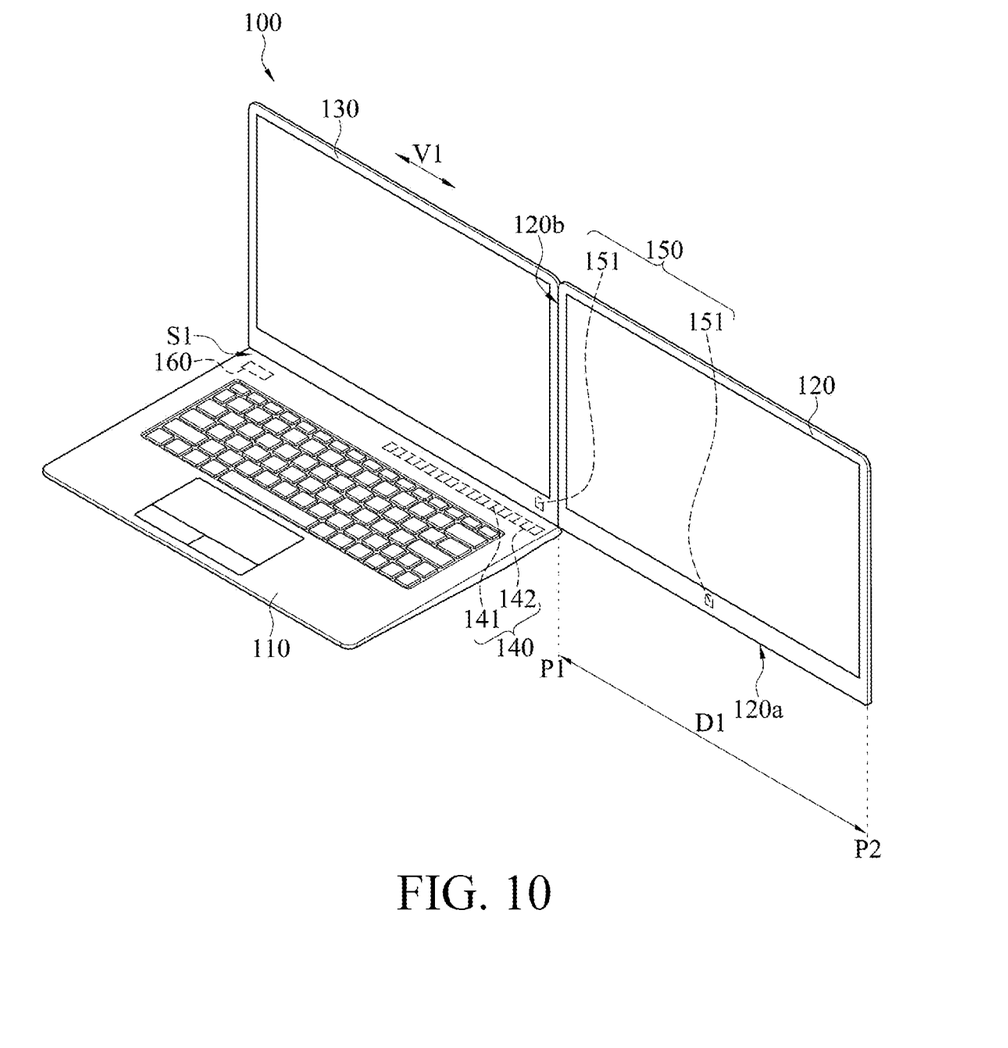
FIG. 10 is a schematic outline diagram of the electronic device at a second slide position according to the third embodiment.
Figure 11:
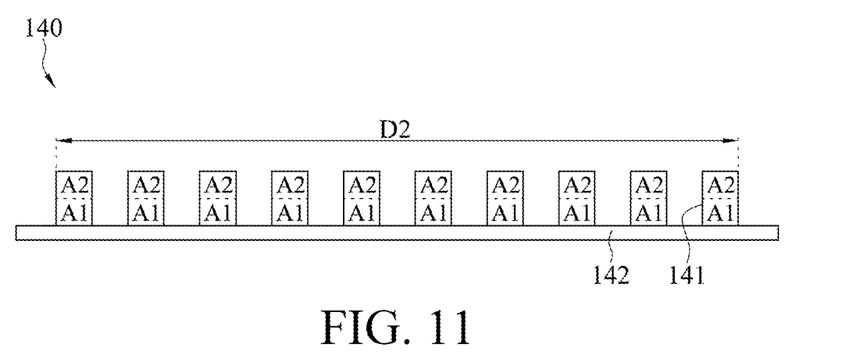
FIG. 11 is a schematic outline diagram of a magnet module according to an embodiment.

In an embodiment, the magnet module 140 provides a magnetic field. As shown in FIG. 11, the magnet module 140 includes a plurality of magnet components 141, and a magnetic field provided by the magnet module 140 is formed by these magnet components 141. As shown in FIG. 10, the magnetic induction module 150 includes at least one magnetic sensor 151. The magnetic sensor 151 is configured to detect a magnetic field. In some embodiments, the host 110 further includes a state control unit 160 and a system (not shown in the figure). The state control unit 160 is coupled to the system and the magnetic induction module 150. In an embodiment, the state control unit 160 controls the host 110 to switch to a system state (such as a standby state, a dormant state, or a sleep state) when the magnetic field strength is detected to an operating threshold by the magnetic sensor 151. In an embodiment, the state control unit 160 switches the host 110 to another system state when the magnetic field strength is detected to an operating threshold by the magnetic sensor 151. In one embodiment, the state control unit 160 switches the host 110 to a dormant state when the magnetic field strength is detected to the operating threshold by the magnetic sensor 151, and switches the host 110 to an operating state (in an embodiment, the system is woken up to resume all work before dormancy) when the magnetic field strength is detected to the release threshold by the magnetic sensor 151. The switchable system states of the host 110 are not limited to the foregoing states. The switchable system states of the host 110 include various usage examples and are defined by a designer or even by a user.

In some embodiments, the magnetic sensor 151 is a Hall sensor or any sensor that is able to detect magnetic force, which is not limited herein. The operating threshold and release threshold of the magnetic sensor 151 are determined by the detecting type and the quality of the magnetic sensor 151. In an embodiment, the magnetic sensor 151 is configured to detect the magnetic field strength of an S pole; the operating threshold (Bop) of the magnetic sensor 151 is 30 Gauss (Gs) to 50 Gs, and the release threshold (Brp) of the magnetic sensor 151 is −50 Gs to −30 Gs, but the disclosure is not limited thereto. In an embodiment, the state control unit 160 is a microcontroller (MCU), but the disclosure is not limited thereto.

Moving the first screen 120 rightwards is used as an example for description below. In an embodiment, the magnet components 141 of the magnet module 140 are arranged at intervals in the first screen 120. The magnetic sensor 151 of the magnetic induction module 150 is disposed in the host 110 and corresponds to the magnet module 140. In another embodiment, the magnet components 141 of the magnet module 140 are arranged at intervals in the host 110. The magnetic sensor 151 of the magnetic induction module 150 is disposed in the first screen 120 corresponds to the magnet module 140. Specifically, the magnet components 141 are disposed in an area of the host 110 (such as the peripheral area that close to the connecting side S1), and the magnetic sensor 151 is disposed at any position on a peripheral area of the first screen 120 (such as the peripheral area that close to the first connecting edge 120a). A description is made below by using such a configuration manner as an example.

Figure 1:
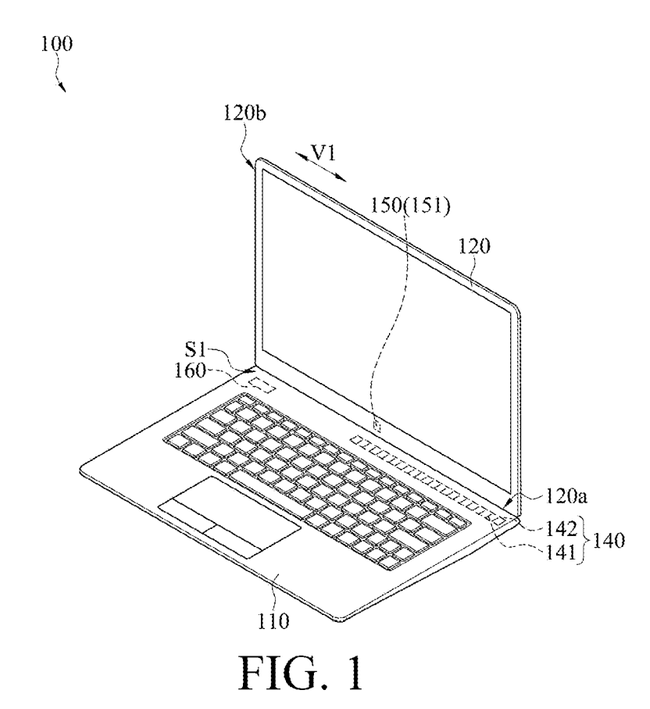
FIG. 1 is a schematic outline diagram of an electronic device at a first slide position according to a first implementation of a first embodiment.
Figure 2:
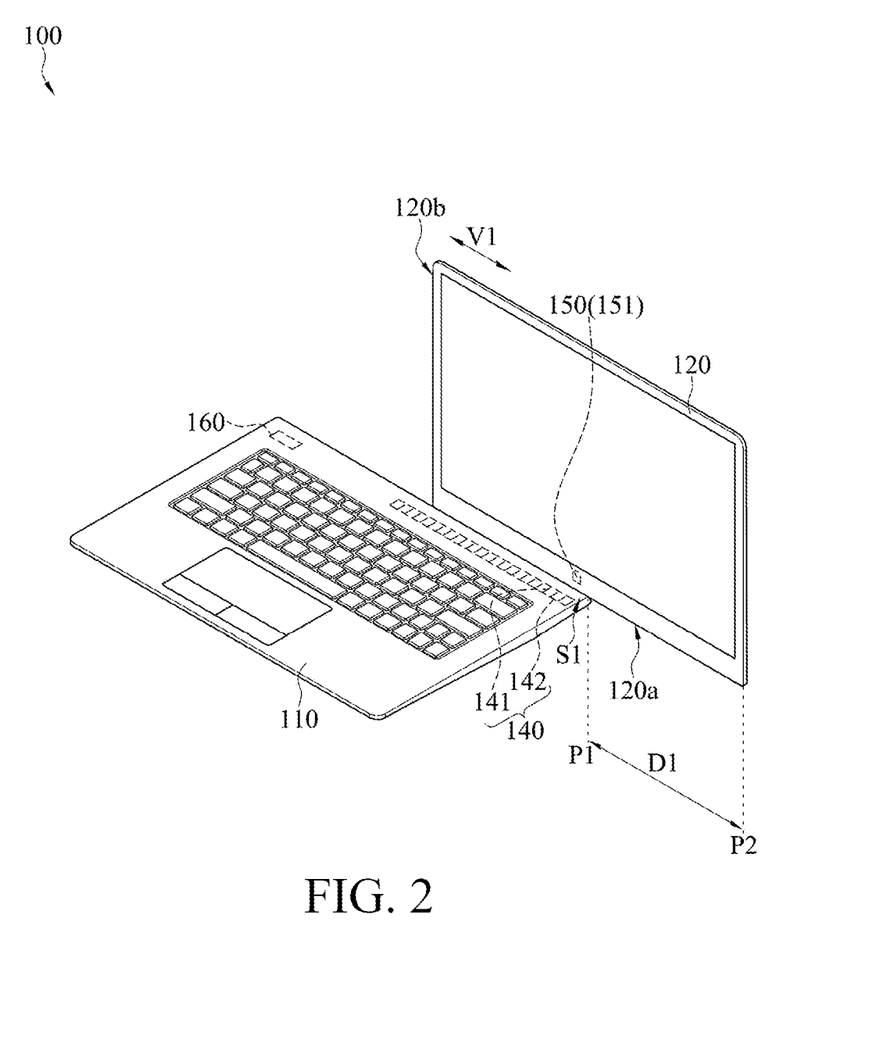
FIG. 2 is a schematic outline diagram of the electronic device at a second slide position according to the first implementation of the first embodiment.
Figure 3:
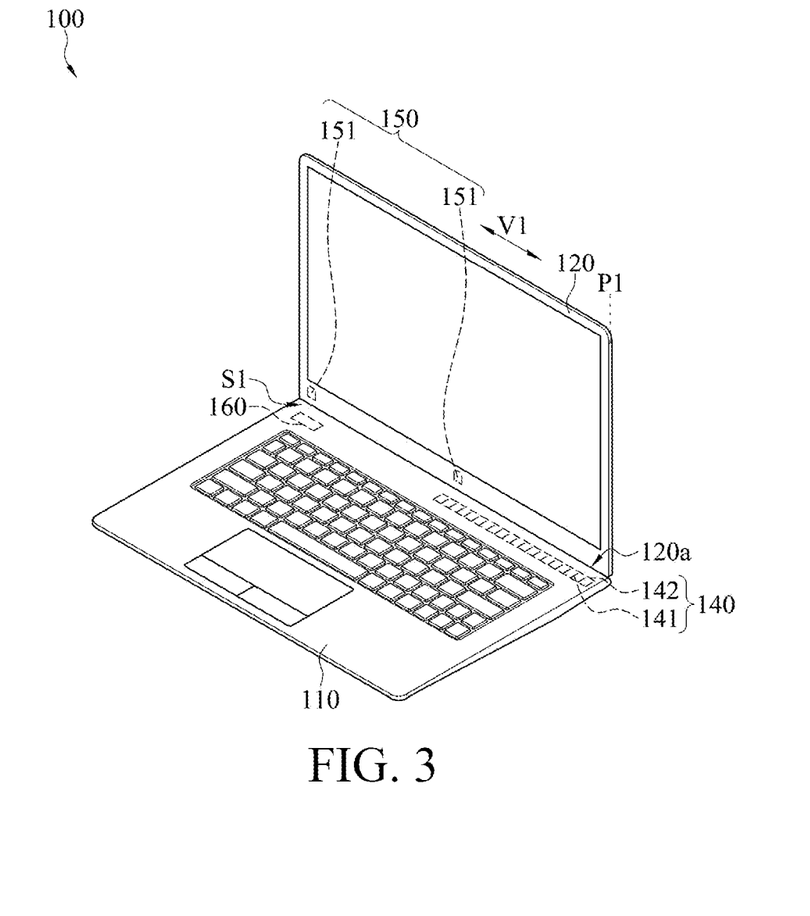
FIG. 3 is a schematic outline diagram of an electronic device at a first slide position according to a second implementation of the first embodiment.
Figure 4:
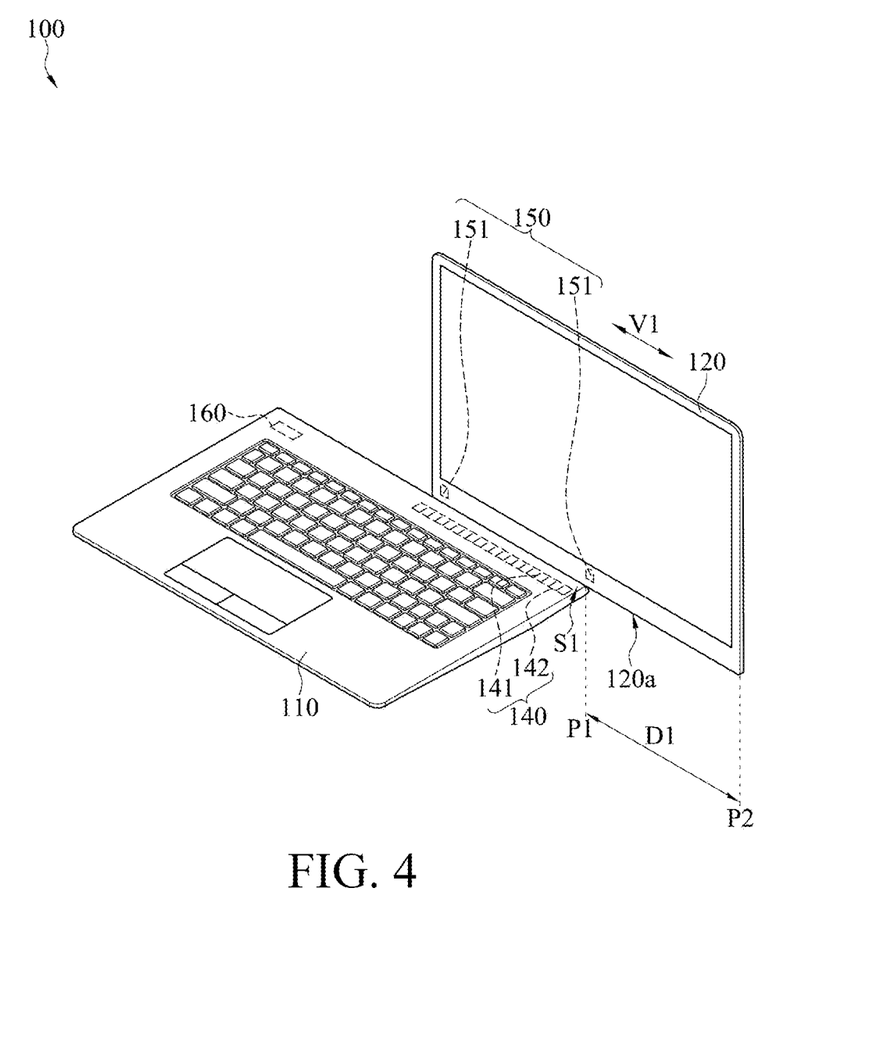
FIG. 4 is a schematic outline diagram of the electronic device at a second slide position according to the second implementation of the first embodiment.

In a first embodiment, a sliding distance D1 between the first slide position P1 and the second slide position P2 is approximately the same as half a length of the host. In an embodiment, as shown in FIG. 1 and FIG. 3, when the first screen 120 is at the first slide position P1, the first screen 120 does not protrude from a left side and a right side of the host 110. In this case, when the first screen 120 is flipped towards and covers the host 110, the entire first screen 120 is overlaid on the host 110. As shown in FIG. 2 or FIG. 4, when the first screen 120 moves rightwards to the second slide position P2, approximately the same as half of the first screen 120 protrudes from the right side of the host 110. In this case, when the first screen 120 is flipped towards and covers the host 110, approximately the same as half of the first screen 120 is overlaid on the host 110.

In an embodiment, the magnet components 141 of the magnet module 140 are arranged at regular intervals in the right part of the connecting side S1 of the host 110, and the description is made below by using the configuration manner as an example. In another embodiment, the magnet components 141 of the magnet module 140 are arranged at regular intervals in the left part of the connecting side S1 of the host 110.

Referring to FIG. 1, FIG. 2, and FIG. 11, in a first implementation of the first embodiment, the magnetic induction module 150 only includes a single magnetic sensor 151. In this case, a distance D2 between a magnet component 141 at the rightmost and a magnet component 141 at the leftmost is at least greater than the sliding distance D1, and the magnetic sensor 151 is located in a center-left part of the first connecting edge 120a of the first screen 120. In this case, when the first screen 120 is flipped towards and covers the host at any position between the first slide position P1 and the second slide position P2, the magnetic sensor 151 sensors a magnetic field of the magnet module 140, so as to cause the host 110 to switch the system state (such as a dormant state) by the state control unit 160. When the first screen 120 is flipped away from the host 110 and no longer covers the host 110, the magnetic sensor 151 detects a change in the magnetic field to cause the system of the host 110 to switch to another system state by the state control unit 160; in an embodiment, the system switches to an operating state.

In any embodiment, the magnetic field strength formed by the magnet components 141 at the same height on the entire magnet module 140 (such as at a certain height in a normal direction of the host 110) is substantially the same. In an embodiment, when the first screen 120, at any position between the first slide position P1 and the second slide position P2, is flipped towards the host 110 to a predetermined angle (such as 45 degrees), a vertical distance between the magnetic sensor 151 of the magnetic induction module 150 and an upper surface of the host 110 reaches a preset height. The magnetic field strength of the magnet components 141 detected by the magnetic sensor 151 of the magnetic induction module 150 is approximately the same, and the detected magnetic field strength reaches the operating threshold of the magnetic sensor 151. Therefore, in some embodiments, as long as the magnetic field strength that detected by the magnetic sensor 151 at a preset height reaches the operating threshold, the intervals between the magnet components 141 in the magnet module 140 are determined according to the size and/or magnetic strength of the magnet components 141.

In an embodiment, as shown in FIG. 11, the magnet module 140 further includes a rectangular iron piece 142. The rectangular iron piece 142 allows the magnet components 141 to be disposed thereon, and smooths magnetic field lines of the magnet components 141. Each magnet component 141 includes a first magnetic pole A1 and a second magnetic pole A2 having different magnetism. In an embodiment, the magnet components 141 are disposed at intervals on the rectangular iron piece 142 and the first magnetic poles A1 of the magnet components 141 face towards a disposed surface of the rectangular iron piece 142, so as to form a same-polarity magnet array with a certain length. In some embodiments, the first magnetic pole A1 is the S-pole, and the second magnetic pole A2 is the N-pole, which is not limited herein. In another embodiment, the first magnetic pole A1 is the N-pole, and the second magnetic pole A2 is the S-pole.

In the first implementation of the first embodiment, a length of the rectangular iron piece 142 is at least greater than the sliding distance D1. Moreover, when the first screen 120 is flipped towards and covers the host at any position between the first slide position P1 and the second slide position P2, an orthographic projection of the magnetic sensor 151 on the host 110 overlaps an orthographic projection of the rectangular iron piece 142 on the host 110. In other words, the magnetic sensor 151 directly faces the rectangular iron piece 142.

Referring to FIG. 3, FIG. 4 and FIG. 11, in a second implementation of the first embodiment, the magnetic induction module 150 further includes at least two magnetic sensors 151. A description is made below by using two magnetic sensors 151 as an example. In this case, a distance D2 between a magnet component 141 at the rightmost and a magnet component 141 at the leftmost is approximately the same as the sliding distance D1. One of the magnetic sensors 151 is approximately located in a center-right part of the first connecting edge 120a of the first screen 120 (or in the middle of the first connecting edge 120a), and the other magnetic sensor 151 is approximately close to the second connecting edge 120b. A distance between the two magnetic sensors 151 is approximately the same as the sliding distance D1. In this way, when the first screen 120 is flipped towards and covers the host at any position between the first slide position P1 and the second slide position P2, at least one magnetic sensor 151 in the magnetic induction module 150 detects the magnetic field of the magnet module 140 and causes the host 110 to switch to a system state (such as a dormant state) by the state control unit 160. When the first screen 120 is flipped away from the host 110 and no longer covers the host 110, at least one magnetic sensor 151 detects a change in the magnetic field to cause the host 110 to switch to another system state (such as an operating state) by the state control unit 160 in an embodiment.

In the second implementation of the first embodiment, a length of the rectangular iron piece 142 is approximately the same as the sliding distance D1. Moreover, when the first screen 120 is flipped towards and covers the host at any position between the first slide position P1 and the second slide position P2, an orthographic projection of at least one magnetic sensor 151 on the host 110 overlaps an orthographic projection of the rectangular iron piece 142 on the host 110. That is, at least one magnetic sensor 151 directly faces the rectangular iron piece 142. It is to be noted that, in this embodiment, the distance D2 between the magnet component 141 at the rightmost and the magnet component 141 at the leftmost is not limited to be less than the sliding distance D1, and the length of the rectangular iron piece 142 is not limited to be less than the sliding distance D1.

It is to be noted that, in any embodiment, a length of the rectangular iron piece 142 (that is, a configuration length of the entire magnet module 140) is related to a quantity of magnetic sensors 151. Accordingly, the more magnetic sensors 151 included in the magnetic induction module 150, the shorter the required length of the rectangular iron piece 142 is.

Referring to FIG. 5 to FIG. 10, in some embodiments, the electronic device 100 further includes a second screen 130. The second screen 130 is roughly rectangular. The second screen 130 is connected to the second connecting edge 120b of the first screen 120 and moves alone with the first screen 120. In an embodiment, when the first screen 120 slides rightwards by a distance of half the length of the host relative to the host 110 along the horizontal axis V1, the second screen 130 also slides rightwards with the first screen 120 by a distance of half the length of the host relative to the host 110. In addition, when the first screen 120 is flipped towards the host 110 along the horizontal axis V1 and covers the host 110, the second screen 130 also flips alone with the first screen 120. In some embodiments, the second screen 130 is connected to the second connecting edge 120b of the first screen 120 by a rotation-shaft mechanism. In this way, the second screen 130 is configured to axially rotate along the second connecting edge 120b relative to the first screen 120. In an embodiment, the second screen 130 is flipped to the back of the first screen 120 or is unfolded to be side by side with the first screen 120.

In some embodiments, the size of the second screen 130 is substantially the same as the size of the first screen 120. In an embodiment, the first screen 120 and the second screen 130 are liquid-crystal display (LCD) screens, light-emitting diode (LED) screens or other suitable types of screens (with a touch function), which is not limited herein.

A description is made below by using an example in which the second screen 130 is unfolded to be side by side with the first screen 120. In particular, the following is an example in which the second screen 130 is arranged in parallel on the left side of the first screen 120, but the disclosure is not limited thereto.

In an embodiment, the magnet components 141 of the magnet module 140 are arranged at intervals in at least one of the first screen 120 or the second screen 130. In an embodiment, the magnetic sensor 151 of the magnetic induction module 150 is disposed in the host 110 and corresponds to the magnet module 140. In another embodiment, the magnet components 141 of the magnet module 140 are arranged at intervals in the host 110. In an embodiment, the magnetic sensor 151 of the magnetic induction module 150 is disposed in at least one of the first screen 120 or the second screen 130 and corresponds to the magnet module 140. In an embodiment, the sliding distance D1 between the first slide position P1 and the second slide position P2 is approximately the same as half the length of the host. In this case, the magnet components 141 of the magnet module 140 are arranged at regular intervals in the right part of the connecting side S1 of the host 110. In other embodiments, the magnet components 141 of the magnet module 140 are arranged at regular intervals in the left part of the connecting side S1 of the host 110.

Figure 5:
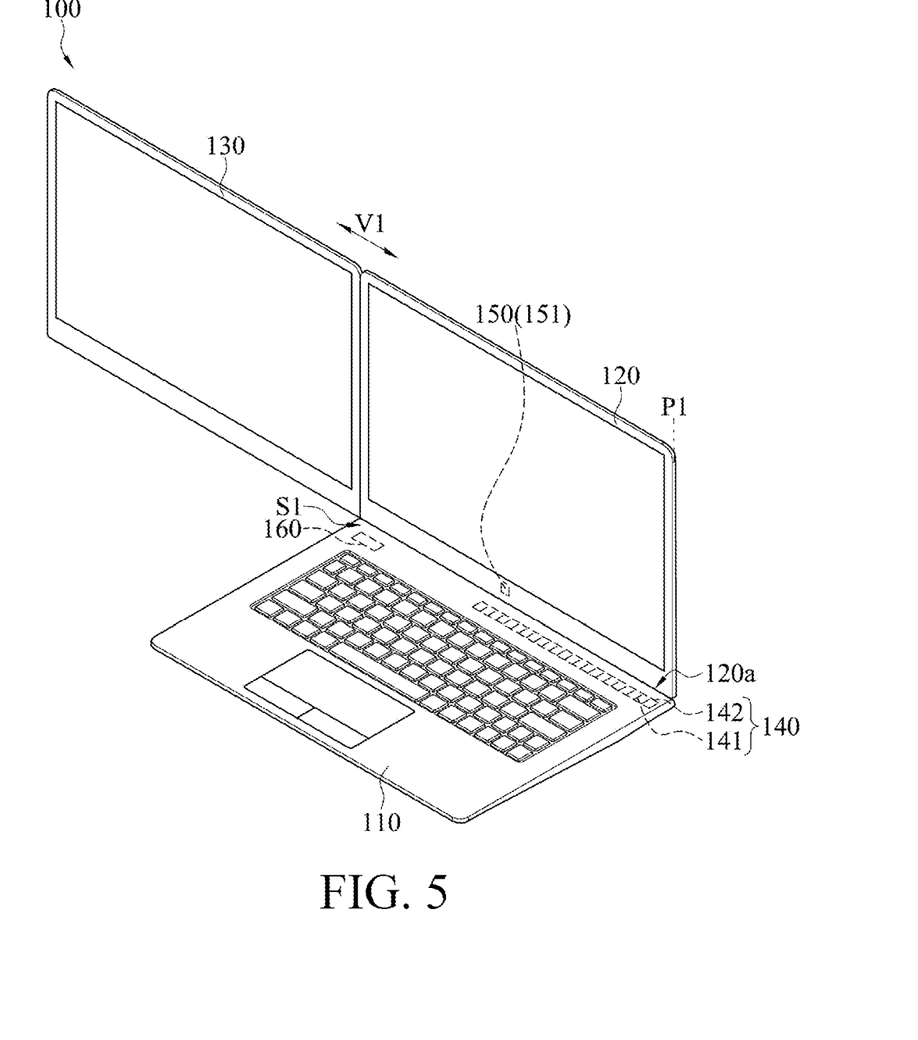
FIG. 5 is a schematic outline diagram of an electronic device at a first slide position according to a first implementation of a second embodiment.
Figure 6:
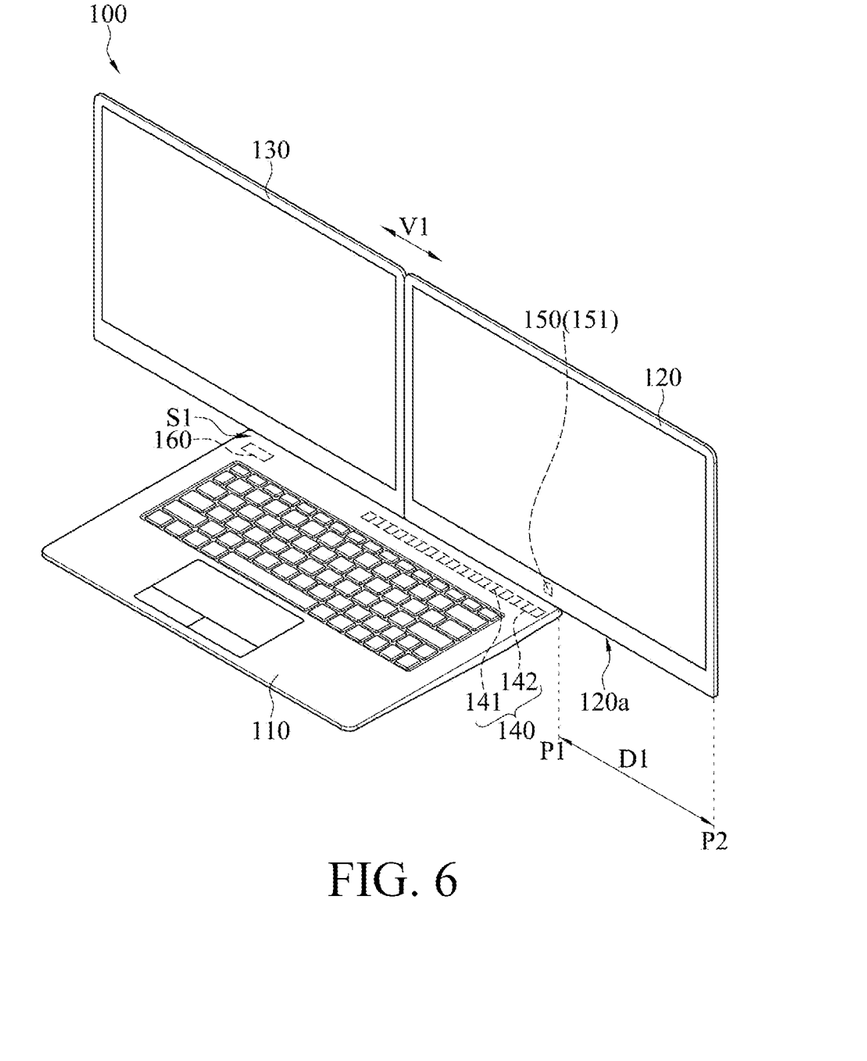
FIG. 6 is a schematic outline diagram of the electronic device at a second slide position according to the first implementation of the second embodiment.

Referring to FIG. 5, FIG. 6, and FIG. 11, the magnetic induction module 150 only includes a single magnetic sensor 151. Since the configuration examples and usage examples of the magnetic induction module 150 and the magnet module 140 shown in FIG. 5, 6 are substantially the same as those shown in FIG. 1, 2, the details are not repeated herein.

Figure 7:
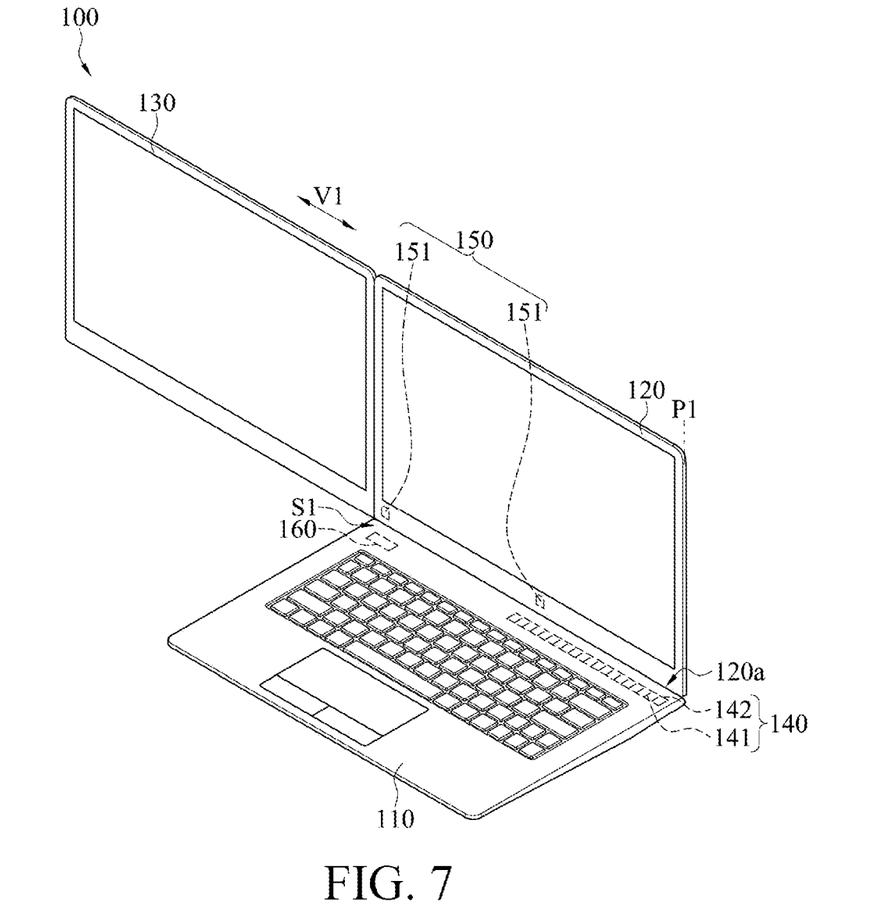
FIG. 7 is a schematic outline diagram of an electronic device at a first slide position according to a second implementation of the second embodiment.
Figure 8:
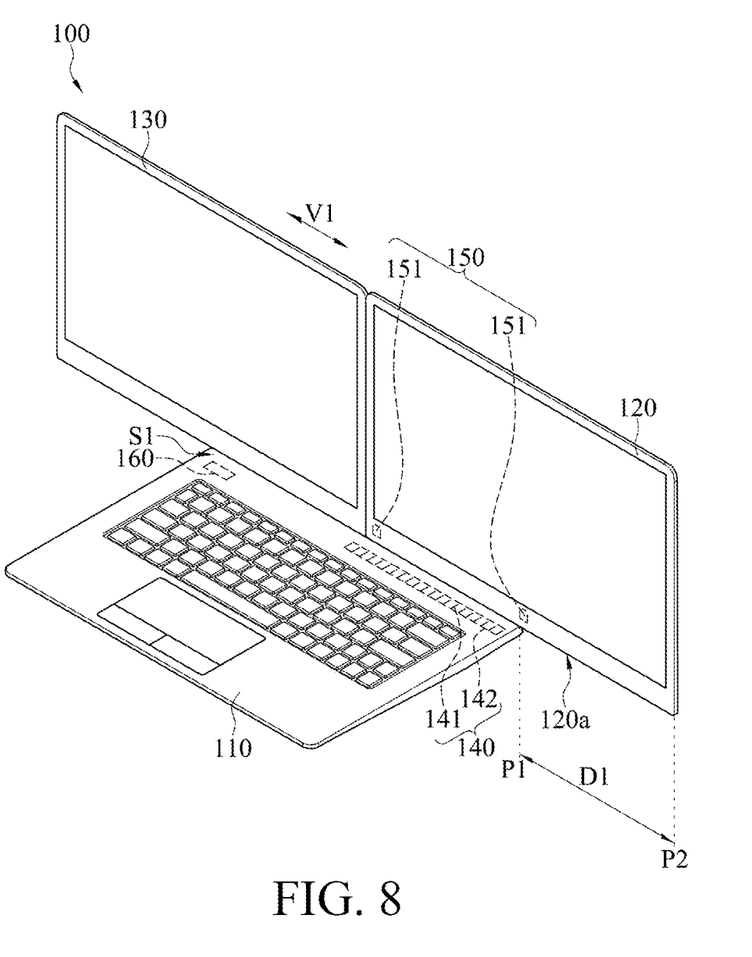
FIG. 8 is a schematic outline diagram of the electronic device at a second slide position according to the second implementation of the second embodiment.

Referring to FIG. 7, FIG. 8, and FIG. 11, the magnetic induction module 150 includes at least two magnetic sensors 151. In this case, although only two magnetic sensors 151 are shown in FIG. 7 and FIG. 8, the quantity is not limited thereto. In addition, since the configuration examples and usage examples of the magnetic induction module 150 and the magnet module 140 shown in FIG. 7 and FIG. 8 are substantially the same as those shown in FIG. 3 and FIG. 4, the details are not repeated herein.

Figure 9:
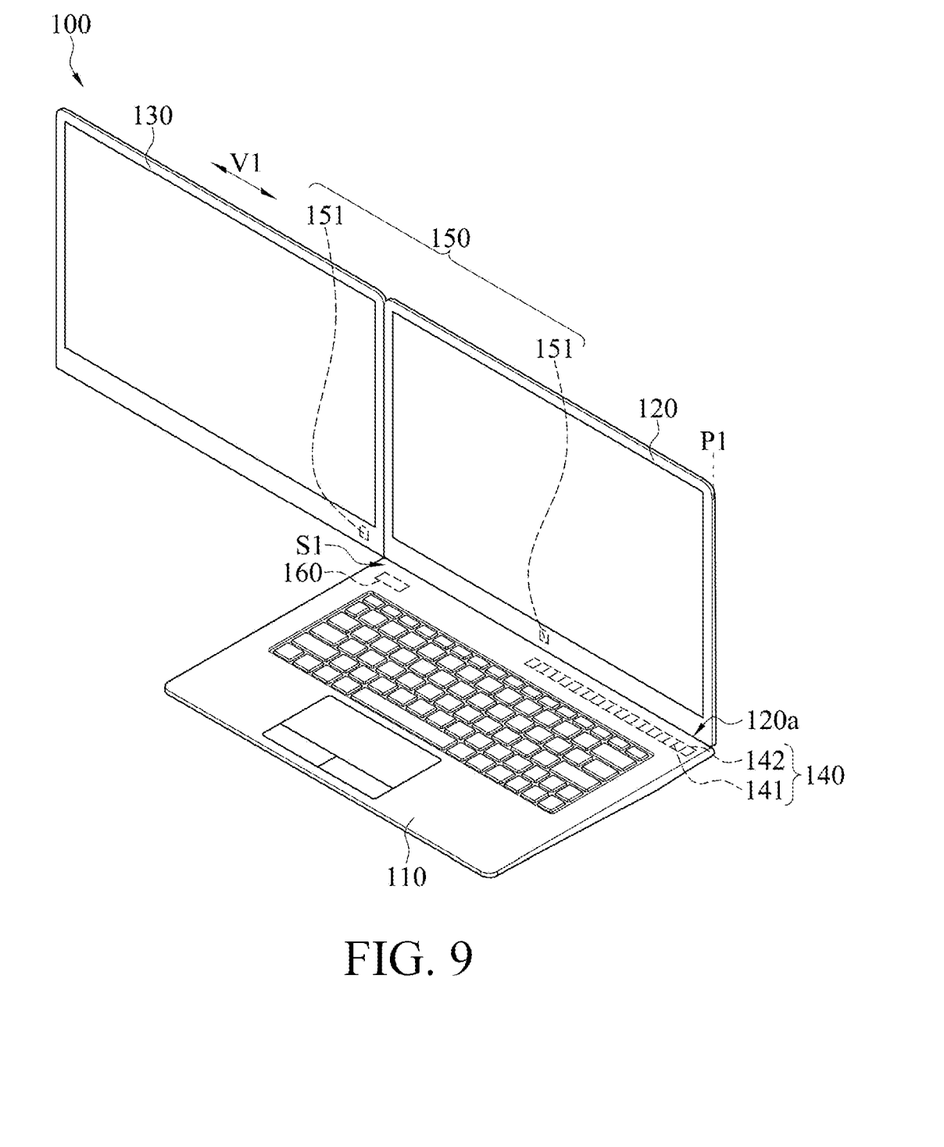
FIG. 9 is a schematic outline diagram of an electronic device at a first slide position according to a third embodiment.

Referring to FIG. 9, FIG. 10, and FIG. 11, in a third embodiment, a plurality of magnet components 141 of a magnet module 140 is arranged at intervals in a first screen 120 and a second screen 130 or in a host 110. A magnetic induction module 150 includes a plurality of magnetic sensors 151. In addition, the magnetic sensors 151 of the magnetic induction module 150 are arranged in the host 110 or in the first screen 120 and the second screen 130, and corresponds to the magnet module 140. In an embodiment, the magnet components 141 are disposed inside a frame of the host 110 (such as a frame close to the connecting side S1), and the magnetic sensors 151 are correspondingly disposed inside a peripheral frame of the first screen 120 (such as a frame close to a first connecting edge 120a) and a peripheral frame of the second screen 130 (such as a frame adjacent to the connecting side S1 of the host 110 when the second screen 130 moves rightwards). A description is made below by using this configuration and two magnetic sensors 151 as an example, but the quantity of the magnetic sensors 151 is not limited thereto.

In an embodiment, a sliding distance D1 between a first slide position P1 and a second slide position P2 is approximately the same as a length of the entire host. In an embodiment, as shown in FIG. 9, when the first screen 120 is at the first slide position P1, the first screen 120 does not protrude from the left and right sides of the host 110, and the second screen 130 protrudes from the left side of the host 110 (that is, when the second screen 130 is arranged in parallel on the right side of the first screen 120, the second screen 130 protrudes from the right side of the host 110). In this case, when the first screen 120 is at the first slide position P1 and the first screen 120 and the second screen 130 are flipped towards the host 110, the entire first screen 120 covers the host 110. As shown in FIG. 10, when the first screen 120 is at the second slide position P2, the first screen 120 protrudes from the right side of the host 110, and the second screen 130 does not protrude from the left and right sides of the host 110. In this case, when the first screen 120 is at the second slide position P2 and the first screen 120 and the second screen 130 are flipped towards the host 110, the entire second screen 130 cover the host 110.

In an embodiment, the magnet components 141 of the magnet module 140 are arranged at regular intervals in a right part of a connecting side S1 of the host 110. In an embodiment, the magnet components 141 of the magnet module 140 are arranged at regular intervals in the left part of the connecting side S1 of the host 110.

In an embodiment, a distance D2 between a magnet component 141 at the rightmost and a magnet component 141 at the leftmost is at least greater than half the length of the host, and one of the magnetic sensors 151 is approximately located in a center-right part of the first connecting edge 120a of the first screen 120 (or in the middle of the first connecting edge 120a), and the other magnetic sensor 151 is approximately close to a second connecting edge 120b of the first screen 120. In this embodiment, a distance between the two magnetic sensors 151 is approximately the same as half the length of the host. In this way, when the first screen 120 is flipped towards and covers the host at any position between the first slide position P1 and the second slide position P2, at least one magnetic sensor 151 in the magnetic induction module 150 detects a magnetic field of the magnet module 140 and causes the host 110 to switch to a system state (such as a dormant state) by a state control unit 160. When the first screen 120 is flipped away from the host 110, at least one magnetic sensor 151 detects a change in the magnetic field to causes the host 110 to switch to another system state (such as an operating state) by the state control unit 160.

In an embodiment, a length of a rectangular iron piece 142 is at least greater than half the length of the host. Moreover, when the first screen 120 is flipped towards the host at any position between the first slide position P1 and the second slide position P2, an orthographic projection of at least one magnetic sensor 151 on the host 110 overlaps an orthographic projection of the rectangular iron piece 142 on the host 110, and at least one magnetic sensor 151 directly faces the rectangular iron piece 142.

In summary, according to the electronic device of the disclosure, with a relative arrangement of a magnet module with a plurality of magnet components and a magnetic induction module with at least one magnetic sensor and the magnetic field induction, the electronic device with two screens configure to switch state of a host by flipping at least one of the two screens towards the host at any position.

The foregoing embodiments and/or implementations are merely preferred embodiments and/or implementations used for describing the technologies in the disclosure, and are not intended to limit implementation forms of the technologies in the disclosure. A person skilled in the art can make alterations or modifications to obtain other equivalent embodiments without departing from the scope of the technical solutions disclosed in the content of the disclosure. Such equivalent embodiments shall still be regarded as technologies or embodiments substantially the same as the disclosure.

What is claimed is:

1. An electronic device, comprising:
    a host;
    a first screen, comprising a first connecting edge, the first screen is slidably connected to the host by the first connecting edge, and the first screen is slidable to any position between a first slide position and a second slide position relative to the host along a horizontal axis parallel to the first connecting edge;
    a magnet module, disposed in the first screen or in the host, the magnet module comprises a plurality of magnet components and a rectangular iron piece, and the magnet components are arranged at intervals on the rectangular iron piece; and
    a magnetic induction module, comprising at least one magnetic sensor, disposed in the host or in the first screen relative to the magnet module, wherein when the first screen is slid to the any position between the first slide position and the second slide position and flipped towards the host, the magnetic induction module causes the host to switch a system state in response to detecting a magnetic field of the magnet module, and wherein an orthographic projection of the at least one magnetic sensor on the host overlaps an orthographic projection of the rectangular iron piece on the host when the first screen is flipped towards and covers the host at the any position between the first slide position and the second slide position, and wherein the orthographic projection of the rectangular iron piece on the host is not overlapped the orthographic projection of the at least one magnetic sensor on the host when in an open position where the first screen is perpendicular to the host.

2. The electronic device according to claim 1, wherein each of the magnet components comprises a first magnetic pole and a second magnetic pole having different magnetism, and each of the magnet components is disposed on the rectangular iron piece by the first magnetic pole facing toward the rectangular iron piece.

3. The electronic device according to claim 1, wherein a sliding distance between the first slide position and the second slide position is half a length of the host.

4. The electronic device according to claim 1, wherein the first screen further comprises a second connecting edge adjacent to the first connecting edge, and the electronic device further comprises:
   a second screen, connected to the second connecting edge and moving alone with the first screen.

5. The electronic device according to claim 4, wherein the magnet components of the magnet module are disposed at intervals in at least one of the first screen and the second screen, and the at least one magnetic sensor of the magnetic induction module is disposed in the host and corresponds to the magnet module.

6. The electronic device according to claim 4, wherein the magnet components of the magnet module are disposed at intervals in the host, and the at least one magnetic sensor of the magnetic induction module is disposed in at least one of the first screen or the second screen and correspond to the magnet module.

7. The electronic device according to claim 4, wherein when the first screen is flipped towards and covers the host along the horizontal axis, the second screen flips with the first screen.

8. The electronic device according to claim 4, wherein the second screen axially rotates relative to the first screen along the second connecting edge.

* * * * *